United States Patent
Minamide

(10) Patent No.: US 11,889,237 B2
(45) Date of Patent: Jan. 30, 2024

(54) SETTING METHOD AND A NON-TRANSITORY COMPUTER-READABLE STORAGE MEDIUM STORING A PROGRAM

(71) Applicant: SEIKO EPSON CORPORATION, Tokyo (JP)

(72) Inventor: Yoshinori Minamide, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/591,014

(22) Filed: Feb. 2, 2022

(65) Prior Publication Data

US 2022/0247985 A1 Aug. 4, 2022

(30) Foreign Application Priority Data

Feb. 3, 2021 (JP) .................................. 2021-016090

(51) Int. Cl.
*H04N 9/31* (2006.01)
*G03B 21/14* (2006.01)
*G09G 5/377* (2006.01)

(52) U.S. Cl.
CPC ........... *H04N 9/3185* (2013.01); *G09G 5/377* (2013.01); *H04N 9/3188* (2013.01)

(58) Field of Classification Search
CPC .. H04N 9/3179; H04N 9/3185; G03B 21/142; G03B 21/147; G03B 21/14
See application file for complete search history.

(56) References Cited

U.S. PATENT DOCUMENTS

| | | | |
|---|---|---|---|
| 2003/0236707 A1 | 12/2003 | Cheney | |
| 2004/0061838 A1* | 4/2004 | Mochizuki | H04N 5/74 353/69 |
| 2019/0116356 A1 | 4/2019 | Matoba et al. | |

FOREIGN PATENT DOCUMENTS

| | | |
|---|---|---|
| JP | 2001-229306 A | 8/2001 |
| JP | 2004-062882 A | 2/2004 |
| JP | 2005-313291 A | 11/2005 |
| JP | 2014-056044 A | 3/2014 |
| JP | 2017-059931 A | 3/2017 |
| WO | 2017/179272 A1 | 10/2017 |
| WO | 2019/017023 A1 | 1/2019 |

OTHER PUBLICATIONS

Sony, "VPL-CWZ10," Optimal Viewing Area Simulation.
Epson, "PowerLite L610U," Projector Throw Distance Simulator, v2.2.3.20210908.

* cited by examiner

*Primary Examiner* — Ryan D Howard
(74) *Attorney, Agent, or Firm* — Oliff PLC

(57) ABSTRACT

A setting method includes acquiring arrangement information including first information representing a positional relationship between a projector and a projection surface and second information representing a size of a first image projected onto the projection surface from the projector, acquiring, based on the arrangement information, one or a plurality of pieces of setting information, each of which including a plurality of setting values used for the projector to project the first image onto the projection surface, and outputting one piece of setting information of the one or plurality of pieces of setting information to the projector.

19 Claims, 7 Drawing Sheets

SETTING METHOD AND A NON-TRANSITORY COMPUTER-READABLE STORAGE MEDIUM STORING A PROGRAM

The present application is based on, and claims priority from JP Application Serial Number 2021-016090, filed Feb. 3, 2021, the disclosure of which is hereby incorporated by reference herein in its entirety.

BACKGROUND

1. Technical Field

The present disclosure relates to a setting method and a non-transitory computer-readable storage medium storing a program.

2. Related Art

JP-A-2014-56044 discloses a technique that enables easy decision on the installation position of a projector and the attitude of the projector at a venue where an image is projected by the projector. In the technique disclosed in JP-A-2014-56044, a plurality of projection layouts showing installation position candidates and attitude candidates for the projector corresponding to the venue where the projector is to be installed, are stored in a database server in advance. A user installing the projector at the venue accesses the database server, using a portable information terminal remotely controlling the projector, and causes the portable information terminal to display a plurality of plan projection layout views corresponding respectively to the plurality of projection layouts corresponding to the venue. The user selects one of the plurality of plan projection layout views displayed on the portable information terminal and installs the projector at the venue, referring to the selected plan projection layout view.

Depending on the positional relationship between the projector and the projection surface on which a projection image is projected from the projector, a correction such as keystone correction needs to be performed on the projection image to be projected from the projector so that a rectangular image is displayed on the projection surface. When performing the correction such as keystone correction on the projection image, a plurality of setting values need to be stored in the projector according to the content of the correction. In the technique disclosed in JP-A-2014-56044, the user needs to manually designate each setting value according to the content of the correction to be performed on the projection image. Manually designating each setting value is troublesome for the user. There is also a problem in that the user does not know what the setting value should be designated when the user is unfamiliar with the handling of the projector.

SUMMARY

An aspect of the present disclosure is directed to a setting method including: acquiring arrangement information including first information representing a positional relationship between a projector and a projection surface and second information representing a size of a first image projected onto the projection surface from the projector; acquiring one or a plurality of pieces of setting information, based on the arrangement information; and outputting one piece of setting information of the one or plurality of pieces of setting information to the projector. Each of the one or plurality of pieces of setting information includes a plurality of setting values used for the projector to project the first image onto the projection surface.

Another aspect of the present disclosure is directed to a non-transitory computer-readable storage medium storing a program. The program causes a computer to execute: acquiring arrangement information including first information representing a positional relationship between a projector and a projection surface and second information representing a size of a first image projected onto the projection surface from the projector; and acquiring one or a plurality of pieces of setting information, based on the arrangement information. Each of the one or plurality of pieces of setting information includes a plurality of setting values used for the projector to project the first image onto the projection surface.

DESCRIPTION OF EXEMPLARY EMBODIMENTS

Embodiments of the present disclosure will now be described with reference to the drawings. The embodiments described below include various technically preferable limitations. However, the present disclosure is not limited to the embodiments described below.

1. First Embodiment

Figure 1:
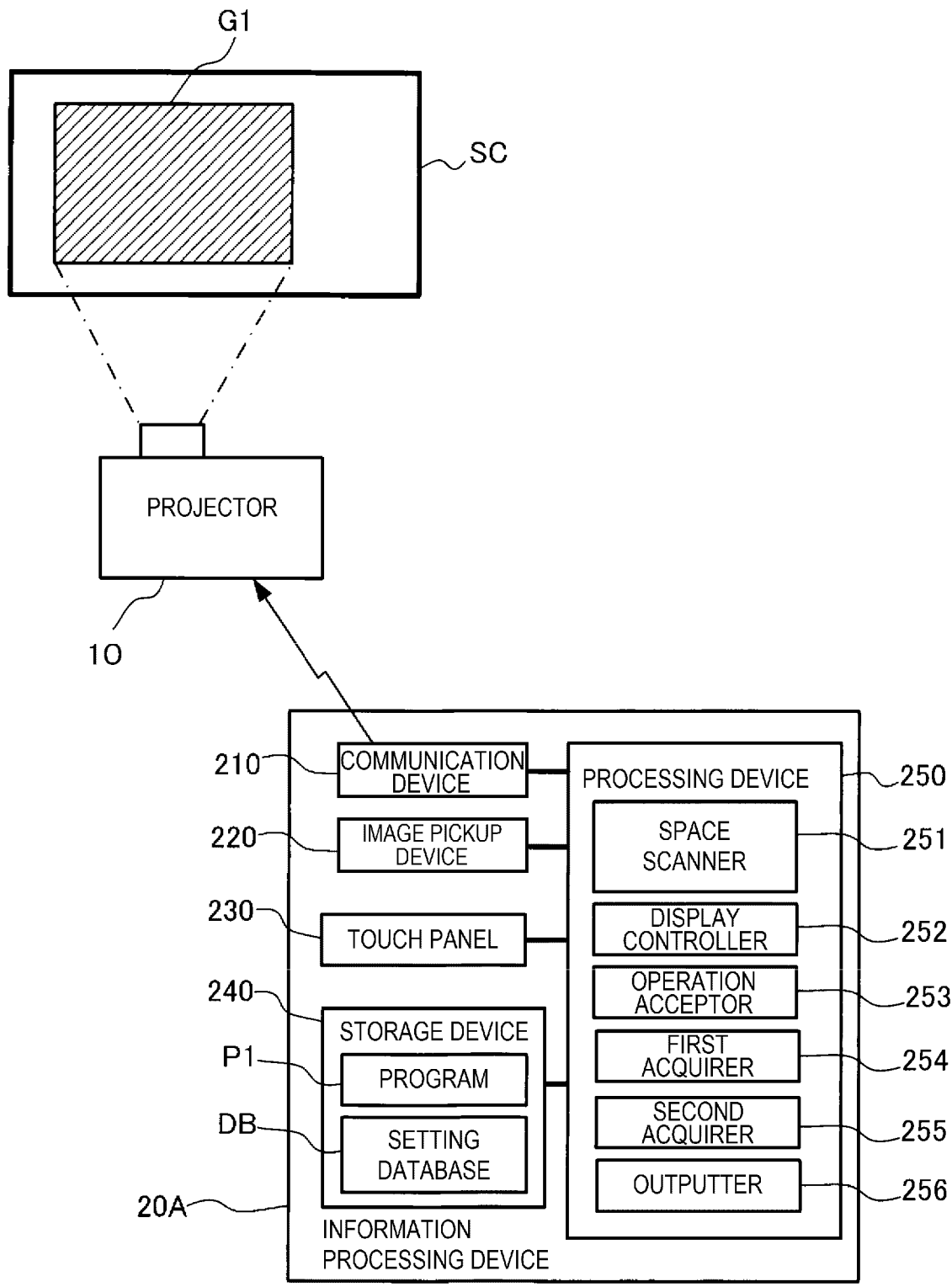
FIG. 1 shows an example of the configuration of an image processing device executing a setting method according to a first embodiment of the present disclosure.

FIG. 1 shows an example of the configuration of an information processing device 20A executing a setting method according to a first embodiment of the present disclosure. This setting method is a method for setting, in a projector 10, setting information including a plurality of setting values used for projecting a projection image G1 onto a projection surface SC. The type of the setting values included in the setting information is decided, based on the model of the projector 10. An example of the setting values included in the setting information may be the focus value representing the focal length of projection light, the amounts of lens shift in vertical and horizontal directions, the amounts of keystone correction in vertical and horizontal directions, and the amount of corner correction representing the amount of movement of the four corners of the projection image G1. The projection image G1 projected onto the projection surface SC from the projector 10 is an example of a first image according to the present disclosure. In FIG. 1, the projector 10, the projection surface SC, and the projection image G1 are illustrated in addition to the information processing device 20A.

The information processing device 20A is a device for causing the projector 10 to store a plurality of setting values. The information processing device 20A is, for example, a smartphone. As shown in FIG. 1, the information processing device 20A has a communication device 210, an image pickup device 220, a touch panel 230, a storage device 240, and a processing device 250. Similarly to a typical smartphone, the information processing device 20A also has an inertial sensor in addition to the communication device 210, the image pickup device 220, the touch panel 230, the storage device 240, and the processing device 250 shown in FIG. 1. However, the inertial sensor is not illustrated in FIG. 1.

The communication device 210 is a wireless communication device executing wireless communication with the projector 10 in conformity with a standard such as Wi-Fi (wireless-fidelity), under the control of the processing device 250. Wi-Fi is a registered trademark. In this embodiment, the communication between the communication device 210 and the projector 10 is wireless communication. However, wired communication via a communication line such as a LAN (local area network) cable may be employed.

The image pickup device 220 is, for example, a camera having a CCD (charge-coupled device) or a CMOS (complementary metal-oxide semiconductor) or the like, which is an image pickup element converting condensed light into an electrical signal. The image pickup device 220 picks up a dynamic image or a still image under the control of the processing device 250. The image pickup device 220 outputs image data representing the picked-up dynamic image or still image to the processing device 250.

The touch panel 230 is a device in which a display device displaying an image and an input device having information inputted thereto by a user are integrated together. The input device is, for example, a transparent sheet-like touch sensor. The input device is provided in such a way as to cover a display surface of the display device. The input device detects a touch position, using an electrostatic capacitance specified by an object in contact with the input device and the input device, and outputs data representing the detected touch position to the processing device 250. Thus, the content of an operation by the user on the touch panel 230 is transmitted to the processing device 250.

The storage device 240 is a recording medium readable by the processing device 250. The storage device 240 includes, for example, a non-volatile memory and a volatile memory. The non-volatile memory is, for example, a ROM (read-only memory), EPROM (erasable programmable read-only memory), or EEPROM (electrically erasable programmable read-only memory). The volatile memory is, for example, a RAM (random-access memory).

Figure 2:
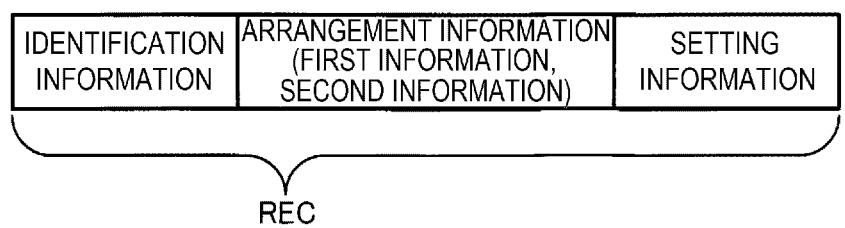
FIG. 2 shows an example of a record forming a setting database stored in a storage device of the information processing device.

In the storage device 240, a setting database DB is stored. The setting database DB is an aggregate of record REC shown in FIG. 2. That is, the setting database DB is formed with a plurality of records REC. As shown in FIG. 2, the record REC stores setting information in association with identification information univocally indicating the model of the projector and arrangement information about the projector of the model indicated by the identification information.

A specific example of the identification information may be a character string representing the model number of the projector or a character string representing the model name of the projector. The arrangement information includes first information and second information, as shown in FIG. 2. The first information represents the positional relationship between the projector indicated by the identification information corresponding to the arrangement information including this first information and the projection surface. The second information represents the size of the projection image displayed on the projection surface.

A specific example of the first information may be information representing the distance between the projector and the projection surface. The first information may also include information representing the place of installation of the projector, information representing the position of installation of the projector, and information representing the attitude of the projector, in addition to the information representing the distance between the projector and the projection surface. An example of the information representing the place of installation of the projector may be information representing whether the projector is suspended from the ceiling or placed on a desk or the like in a space such as a room which includes the projection surface and where the projector is installed. A specific example of the information representing the position of installation of the projector may be information representing the distance from each wall demarcating the space where the projector is installed and information representing the height from the floor. A specific example of the information representing the attitude of the projector may be, for example, the amount of rotation of the projector about a vertical axis passing through the center of gravity of the projector, the amount of rotation of the projector about the optical axis of projection light projected from the projector, and the amount of rotation of the projector about an axis orthogonal to the vertical axis and orthogonal to the optical axis.

A specific example of the second information may be information representing the aspect ratio of the projection image displayed on the projection surface and the diagonal length of the projection image. The second information may include information representing the shape of the projection image displayed on the projection surface. A specific example of the information representing the shape of the projection image may be information representing the form of discrepancy from a rectangle such as a rectangle with no distortion, a vertical keystone distortion, a horizontal keystone distortion, or a vertical-horizontal combined distortion, and the degree of discrepancy. The second information may include information representing the attitude of the projection surface or the type of the projection surface. A specific example of the information representing the type of the projection surface may be information representing one of planar surface, curve surface, and corner walls. When the projection surface is a curved surface, the second information may include information representing the degree of curve of the projection surface such as curvature. When the projection surface is corner walls, the second information may include information representing the angle formed by the wall surfaces of the corner walls.

The setting information includes a plurality of setting values used for the projector whose positional relationship with the projection surface is represented by the first information of the arrangement information included in the record REC to which this setting information belongs, to project a projection image of the size represented by the second information of this arrangement information onto the projection surface. As described above, a specific example of the setting values included in the setting information may be the focus value, the amounts of lens shift in vertical and horizontal directions, the amounts of keystone correction in vertical and horizontal directions, and the amount of corner correction.

In the setting database DB in this embodiment, a plurality of records REC including the same identification information and the same arrangement information but different pieces of setting information may be stored in some cases. This is because even when the same identification information and the same arrangement information are employed, setting information for a case where priority is given to the amount of light of the projection light, that is, the brightness of the projection image, and setting information for a case where priority is given to the smallness of the discrepancy of the projection image from a rectangle, are different from each other, and records REC corresponding to the individual cases may be stored in the setting database DB. Therefore, when the setting database DB is searched using the identification information and the arrangement information as search keys, one record REC or a plurality of records REC may be hit. The record REC in this embodiment includes the identification information, the arrangement information, and the setting information. However, the record REC may also include additional information in addition to these pieces of information. A specific example of the additional information may be information representing the model number of a projection lens provided in the projector whose model is represented by the identification information, or information representing the price of the projector, or the like. The plurality of records REC forming the setting database DB include a record REC including the identification information of the projector 10.

In the non-volatile memory of the storage device 240, a program P1 executed by the processing device 250 is stored in advance. The volatile memory of the storage device 240 is used by the processing device 250 as a work area for executing the program P1. The program P1 may also be referred to as □application program□, □application software□, or □app□. The program P1 is acquired, for example, from a server or the like, not illustrated, via the communication device 210 and is subsequently stored in the storage device 240.

The processing device 250 includes, for example, a processor such as a CPU (central processing unit), that is, a computer. The processing device 250 may be formed with a single computer or a plurality of computers. The processing device 250 reads out the program P1 from the non-volatile memory to the volatile memory and starts executing of the program P1 in response to an operation entered to the input device of the touch panel 230, the operation giving an instruction to start executing the program P1. The processing device 250 operating according to the program P1 functions as a space scanner 251, a display controller 252, an operation acceptor 253, a first acquirer 254, a second acquirer 255, and an outputter 256 shown in FIG. 1. The space scanner 251, the display controller 252, the operation acceptor 253, the first acquirer 254, the second acquirer 255, and the outputter 256 shown in FIG. 1 are software modules implemented by causing the processing device 250 to operate according to the program P1. The functions of each of the space scanner 251, the display controller 252, the operation acceptor 253, the first acquirer 254, the second acquirer 255, and the outputter 256 are described below.

The space scanner 251 picks up an image of the space which includes the projection surface SC and where the projector 10 is installed, using the image pickup device 220, and thus acquires spatial information representing the width, depth, and height of the space, using an existing AR (augmented reality) technique. This spatial information includes transformation information for transformation between a position on the image of the space including the projection surface SC picked up by the image pickup device 220 and a position in the space. The space scanner 251 causes the display device to display a message instructing the user to stand at an arbitrary position within the space which includes the projection surface SC and where the projector 10 is installed, hold the information processing device 20A with the image pickup device 220 facing a wall of the space, and pick up a dynamic image while turning around 360 degrees at that position.

The space scanner 251 additionally writes an output value from the inertial sensor, not illustrated, into the volatile memory of the storage device 240 every predetermined time while the user is picking up an image of the space with the image pickup device 220. The space scanner 251 then extracts a natural feature point based on color or the like with respect to each of a plurality of frames forming the dynamic image picked up by the image pickup device 220 and specifies a change in the position of the natural feature point occupying each frame, that is, a movement of the natural feature point. The space scanner 251 then acquires spatial information, for example, by a technique similar to three-dimensional measurement using a stereo camera, based on the movement of the feature point over the plurality of frames forming the dynamic image and the change in the position and direction of the image pickup device 220 indicated by a series of output values stored in the volatile memory.

Figure 3:
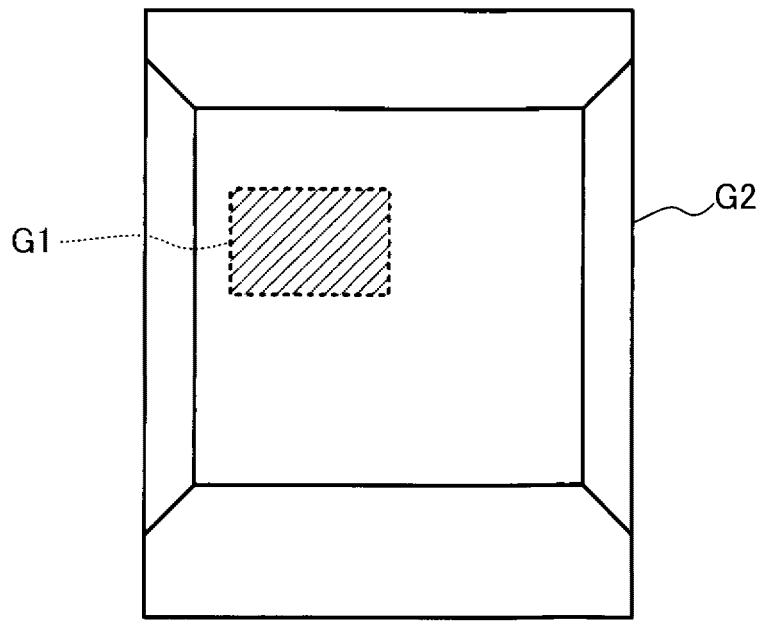
FIG. 3 shows an example of an image G2 acquired by an image pickup device picking up an image of a space including a projection surface.
Figure 4:
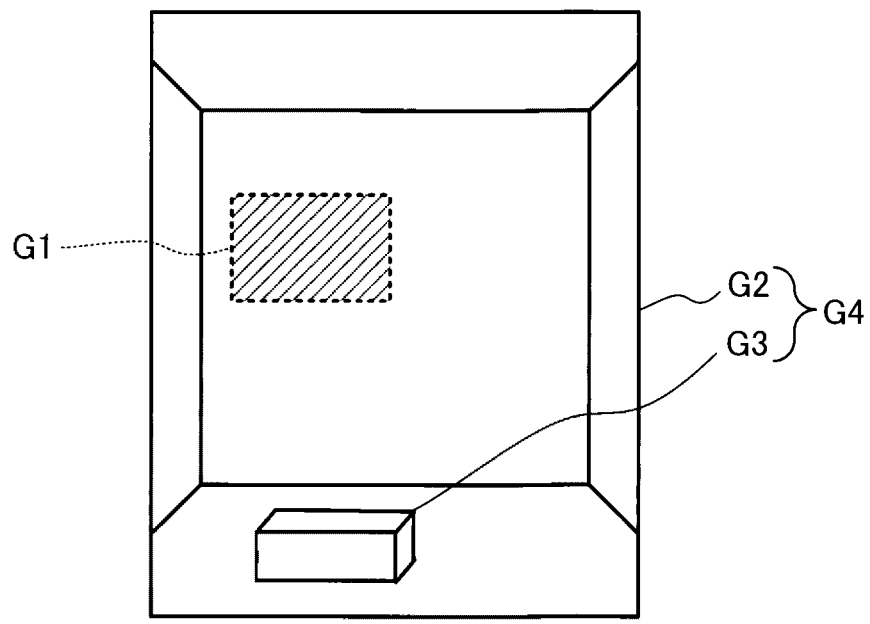
FIG. 4 shows an example of a simulation image.

The display controller 252 causes the display device of the touch panel 230 to display a simulation image for causing the user to designate the positional relationship between the projector 10 and the projection surface SC and the size of the projection image G1 projected onto the projection surface SC from the projector 10. The simulation image in this embodiment is an image formed by superimposing an icon indicating the projector 10 on the image of the space including the projection surface SC picked up by the image pickup device 220. It is now assumed that an image G2 shown in FIG. 3 is acquired as the picked-up image of the space including the projection surface SC picked up by the image pickup device 220. In the example shown in FIG. 3, the projection image G1 is projected on the wall at the back side, of the walls demarcating the space picked up by the image pickup device 220. That is, in the example shown in FIG. 3, the wall at the back side, of the walls demarcating the space picked up by the image pickup device 220, is the projection surface SC. When the image G2 shown in FIG. 3 is acquired as the picked-up image picked up by the image pickup device 220, the display controller 252 causes the display device of the touch panel 230 to display a simulation image G4 formed by superimposing an icon G3 indicating the projector 10 on the image G2, as shown in FIG. 4. The image G2 of the space including the projection surface SC picked up by the image pickup device 220 is an example of a second image according to the present disclosure. The icon G3 indicating the projector 10 is an example of a third image according to the present disclosure.

The image G2 may be one of the plurality of frames forming the dynamic image picked up in the process of acquiring the spatial information by the space scanner 251 or may be a still image picked up separately from the dynamic image. In the former case, it is preferable that the image G2 is a frame in which the wall that is the projection surface SC is shown at the front, of the plurality of frames forming the dynamic image, so as not to cause any trouble in the designation of the size of the projection image G1. In the latter case, it is preferable to pick up an image of the space including the projection surface SC from the same position as the image pickup position for the dynamic image, so as not to invalidate the spatial information acquired by the space scanner 251.

The operation acceptor 253 accepts an operation of designating the positional relationship between the projector 10 and the projection surface SC, that is, the distance between the projector 10 and the projection surface SC in the simulation image G4, and an operation of designating the size of the projection image G1. More specifically, the operation acceptor 253 causes the display device of the touch panel 230 to display a message prompting the user to execute these operations, as superimposed on the simulation image G4. The user performs an operation of dragging and dropping the icon G3 on the touch panel 230 displaying the simulation image G4 and thus can designate the position of the projector 10. The user also performs an operation of tapping on an area to be the projection surface SC on the touch panel 230 displaying the simulation image G4 and thus can designate the position of the projection surface SC. For example, the user taps on an area corresponding to the wall at the back side in the simulation image G4 and thus designates the position of the projection surface SC. When the position of the projector 10 and the position of the projection surface SC are designated on the simulation image G4, the distance between the projector 10 and the projection surface SC in the simulation image G4, that is, the positional relationship between the projector 10 and the projection surface SC, is decided.

Figure 5:
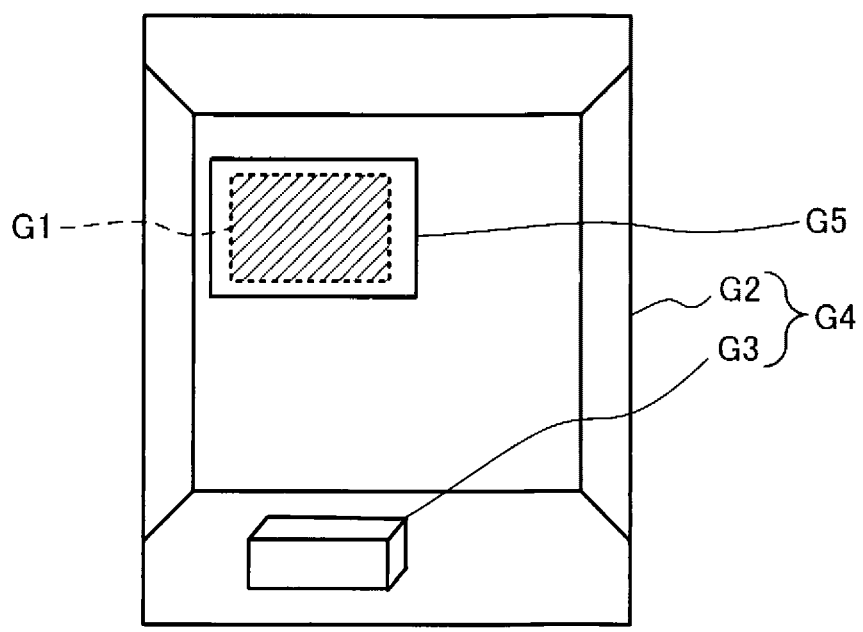
FIG. 5 shows an example of display of an image for designating the size of a projection image.

When the position of the projection surface SC is designated, the display controller 252 superimposes a rectangular image G5 corresponding to the projection image G1 at the designated position in the simulation image G4, as shown in FIG. 5. The simulation image G4 with the image G5 superimposed thereon is an example of a fourth image according to the present disclosure. The user performs an operation of enlarging or reducing the image G5 and thus can designate the size of the projection image G1 on the simulation image G4. The operation of designating the size of the image G5 is an example of a first operation according to the present disclosure. The operation of designating the positional relationship between the projector 10 and the projection surface SC in the simulation image G4 is an example of a second operation according to the present disclosure. In this embodiment, the operation acceptor 253 also accepts a model designation operation of inputting identification information representing the model of the projector 10 that is the output destination of the setting information. In this embodiment, the user executes the model designation operation of inputting the identification information of the projector 10.

The first acquirer 254 generates size information representing the actual size of the projection image G1 according to the first operation accepted by the operation acceptor 253. The first acquirer 254 also generates positional relationship information representing the actual positional relationship between the projector 10 and the projection surface SC according to the second operation accepted by the operation acceptor 253. More specifically, the first acquirer 254 transforms information representing the size of the image G5 designated by the first operation, using the spatial information, and thus acquires the size information. Similarly, the first acquirer 254 transforms information representing the positional relationship designated by the second operation, using the spatial information, and thus acquires the positional relationship information. In this embodiment, the first acquirer 254 acquires the identification information inputted by the model designation operation.

The second acquirer 255 searches the setting database DB, using the size information, the positional relationship information, and the identification information acquired by the first acquirer 254 as a search key, and thus acquires one or a plurality of pieces of setting information corresponding to the search key. More specifically, the second acquirer 255 acquires setting information that corresponds to identification information that is the same as the identification information included in the search key and that corresponds to the arrangement information including first information that is the same as the positional relationship information included in the search key and second information that is the same as the size information included in the search key, from the setting database DB.

The outputter 256 outputs one piece of setting information, of the one or plurality of setting information acquired by the second acquirer 255, to the projector 10 via the communication device 210, and thus causes the projector 10 to store a plurality of setting values included in the setting information. In this embodiment, the outputter 256 outputs the setting information designated by the user by the operation on the touch panel 230, to the projector 10 via the communication device 210. At least one of the identification information and the arrangement information, and the setting information may be outputted.

Figure 6:
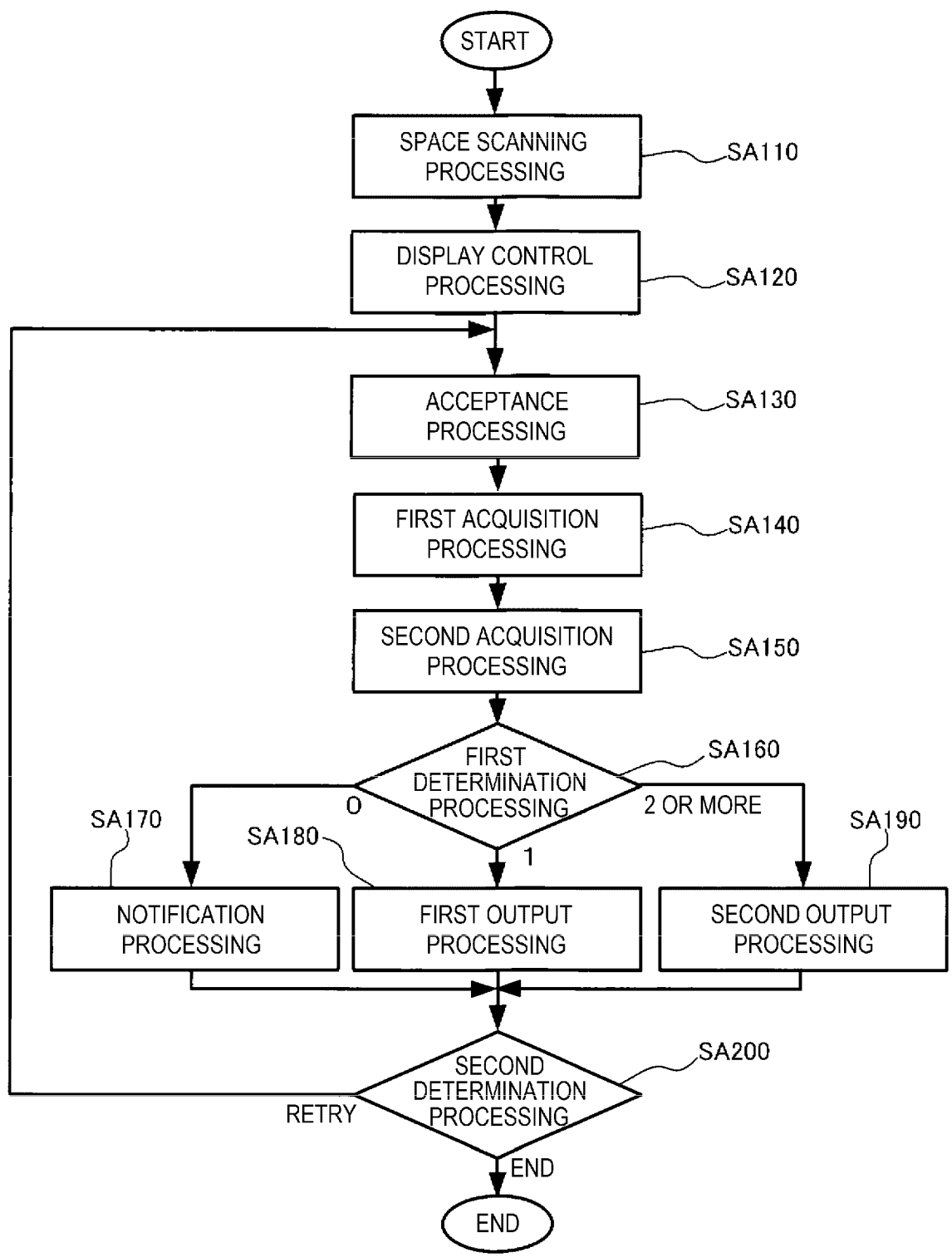
FIG. 6 is a flowchart showing a flow of the setting method according to the first embodiment.

The processing device 250 operating according to the program P1 executes a setting method that notably exhibits the features of this embodiment. FIG. 6 is a flowchart showing the flow of this setting method. As shown in FIG. 6, this setting method includes space scanning processing SA110, display control processing SA120, acceptance processing SA130, first acquisition processing SA140, second acquisition processing SA150, first determination processing SA160, notification processing SA170, first output processing SA180, second output processing SA190, and second determination processing SA200.

In the space scanning processing SA110, the processing device 250 functions as the space scanner 251. In the space scanning processing SA110, the processing device 250 picks up an image of the space including the projection surface SC, using the image pickup device 220, and thus acquires the spatial information. In the display control processing SA120, the processing device 250 functions as the display controller 252. In the display control processing SA120, the processing device 250 causes the display device of the touch panel 230 to display the simulation image G4 for causing the user to designate the positional relationship between the projector 10 and the projection surface SC and the size of the projection image G1. In the acceptance processing SA130, the processing device 250 functions as the operation acceptor 253. In the acceptance processing SA130, the processing device 250 outputs a message designating the execution of the first operation, the second operation, and the model designation operation, and accepts these operations.

In the first acquisition processing SA140, the processing device 250 functions as the first acquirer 254. In the first acquisition processing SA140, the processing device 250 acquires the size information according to the first operation accepted in the acceptance processing SA130. In the first acquisition processing SA140, the processing device 250 also acquires the positional relationship information according to the second operation accepted in the acceptance processing SA130. In the first acquisition processing SA140, the processing device 250 also acquires the identification information accepted by the model designation operation.

In the second acquisition processing SA150, the processing device 250 functions as the second acquirer 255. In the second acquisition processing SA150, the processing device 250 searches the setting database DB, using the arrangement information and the identification information acquired in the first acquisition processing SA140 as a search key, and thus acquires setting information corresponding to the search key.

In the first determination processing SA160, the processing device 250 determines whether the number of pieces of setting information acquired in the second acquisition processing SA150 is 0, 1, or 2 or more.

When the number of pieces of setting information acquired in the second acquisition processing SA150 is 0, the processing device 250 executes the notification processing SA170. In the notification processing SA170, the processing device 250 causes the display device of the touch panel 230 to display a message showing that there is no setting information corresponding to the identification information and the arrangement information accepted in the acceptance processing SA130. In the second determination processing SA200 following the notification processing SA170, the processing device 250 causes the touch panel 230 to display virtual operators serving as a □RETRY□ button for giving an instruction to re-enter identification information and arrangement information and an □END□ button for giving an instruction not to re-enter identification information and arrangement information, and determines which virtual operator is pressed. When it is determined that an operation of pressing the □RETRY□ button has been performed, the processing device 250 executes again the processing from the acceptance processing SA130 onward. Meanwhile, when it is determined that the □END□ button has been pressed, the processing device 250 ends this setting method.

When the number of pieces of setting information acquired in the second acquisition processing SA150 is 1, the processing device 250 executes the first output processing SA180. In the first output processing SA180, the processing device 250 functions as the outputter 256. In the first output processing SA180, the processing device 250 outputs the one piece of setting information acquired in the second acquisition processing SA150 to the projector 10. When the projector 10 is already installed at the position corresponding to the position designated in the acceptance processing SA130 in the space including the projection surface SC, the projector 10 may be made to project the projection image G1 according to the setting information outputted in the first output processing SA180. The user can actually check whether the desired projection image G1 is displayed on the projection surface SC or not. On completion of the execution of the first output processing SA180, the processing device 250 executes the second determination processing SA200. When the desired projection image G1 is displayed on the projection surface SC, the user presses the □END□ button to end this setting method. When the desired projection image G1 is not displayed on the projection surface SC, the user can press the □RETRY□ button to reset the setting information.

When the number of pieces of setting information acquired in the second acquisition processing SA150 is 2 or more, the processing device 250 executes the second output processing SA190. In the second output processing SA190, the processing device 250 functions as the outputter 256. In the second output processing SA190, the processing device 250 accepts an operation of selecting one piece of setting information from among the plurality of pieces of setting information acquired in the second acquisition processing SA150. Specifically, the user is made to select one piece of setting information from among the plurality of pieces of setting information and the selected setting information is outputted to the projector 10. The processing device 250 may cause the display device of the touch panel 230 to display a list of the plurality of pieces of setting information and a message prompting the user to select one piece of setting information. When the projector 10 is already installed at the position corresponding to the position designated in the acceptance processing SA130 in the space including the projection surface SC, each of the plurality of pieces of setting information acquired in the second acquisition processing SA150 may be outputted to the projector 10, for example, in order from the smallest discrepancy from a rectangle. Then, the user may be made to check whether the desired projection image G1 is projected on the projection surface SC or not, and may be made to select one piece of setting information. On completion of the execution of the second output processing SA190, the processing device 250 executes the second determination processing SA200. When the desired projection image G1 is displayed on the projection surface SC, the user presses the □END□ button to end this setting method. When the desired projection image G1 is not displayed on the projection surface SC based on any of the plurality of pieces of setting information, the user can press the □RETRY□ button to reset the reset setting information.

As described above, with the information processing device 20A according to this embodiment, the user performs the operation of designating the position of the icon G3 in the simulation image G4 and the operation of designating the size of the image G5 and thus can cause the projector 10 to store the setting information for projecting the projection image G1 of that size onto the projection surface SC from the projector 10 installed at that position. The information processing device 20A according to this embodiment enables even a user who is unfamiliar with the handling of the projector 10 to easily configure a setting on the projector 10.

2. Second Embodiment

Figure 7:
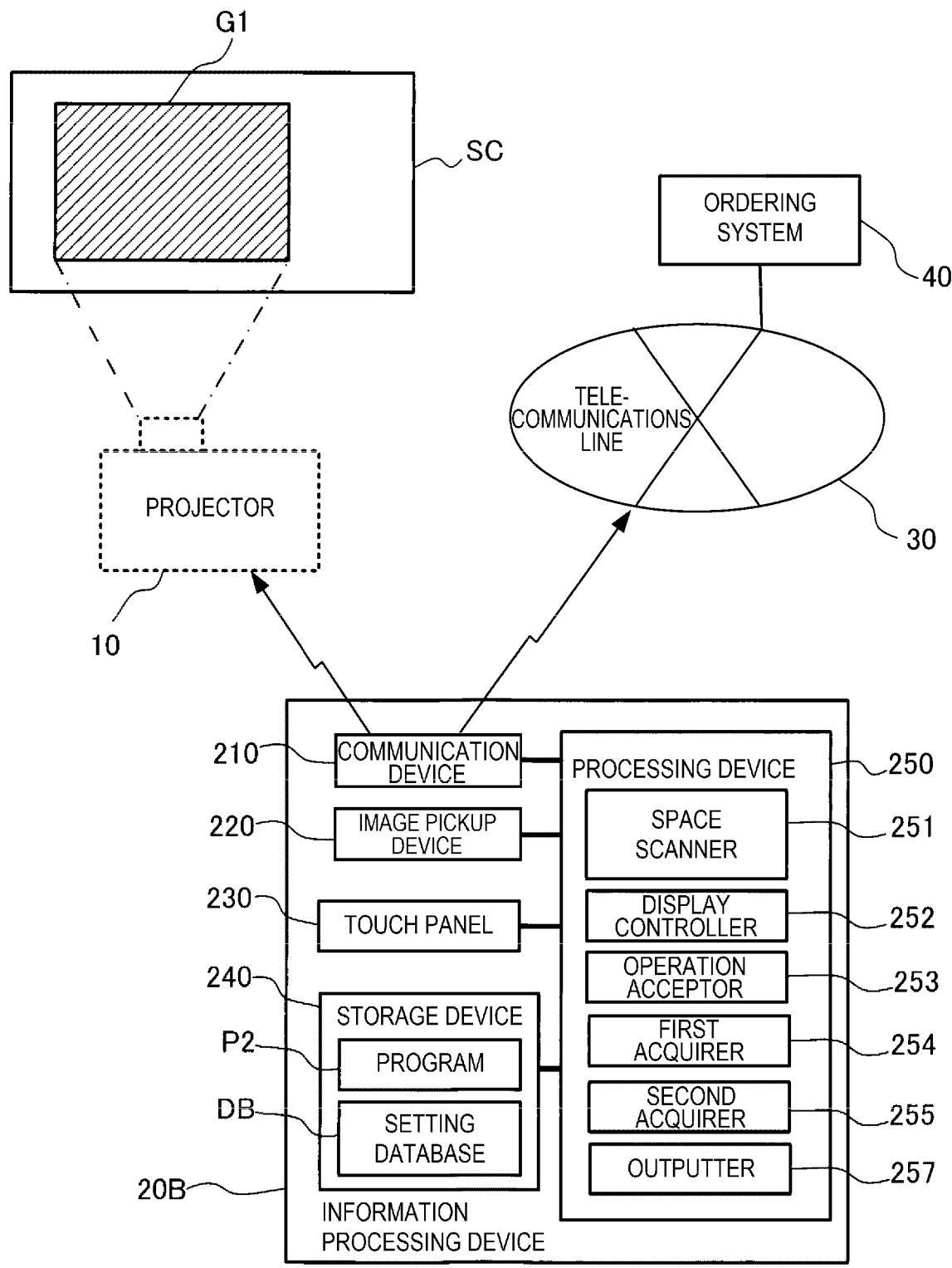
FIG. 7 shows an example of the configuration of a communication system including an information processing device and an ordering system according to a second embodiment of the present disclosure.

FIG. 7 shows an example of the configuration of an information processing device 20B according to a second embodiment of the present disclosure and a communication system including the information processing device 20B. In FIG. 7, the same components as in FIG. 1 are denoted by the same reference signs. As is clear from the comparison between FIG. 7 and FIG. 1, the configuration of the information processing device 20B differs from the configuration of the information processing device 20A in that a program P2 instead of the program P1 is stored in the storage device 240.

In FIG. 7, the projector 10 is illustrated with a dotted line. This means that the user of the information processing device 20B does not have the projector 10 at hand. Since the user of the information processing device 20B does not have the projector 10 at hand, in this embodiment, there is a case where the identification information is not designated as a search key for searching the setting database DB. That is, in this embodiment, there is a case where only the arrangement information is designated as a search key for searching the setting database DB. The case where only the arrangement information is designated will now be described.

As shown in FIG. 7, the communication system including the information processing device 20B includes an ordering system 40. The ordering system 40 is a computer system for managing the acceptance of an order for purchasing the projector 10 and the dispatch of the ordered projector 10. In this embodiment, the information processing device 20B can communicate with the ordering system 40 via a telecommunications line 30 such as the internet. In this embodiment, the information processing device 20B and the ordering system 40 are linked together. Thus, the setting information can be stored in the projector 10 ordered from the ordering system 40 by the setting method according to the present disclosure, and the projector 10 in this state can be dispatched to the ordering party who has placed the order.

The processing device 250 of the information processing device 20B operates according to the program P2 and thus functions as the space scanner 251, the display controller 252, the operation acceptor 253, the first acquirer 254, the second acquirer 255, and a transmitter 257. The transmitter 257 transmits one piece of setting information, of a plurality of pieces of setting information acquired by the second acquirer 255, to the ordering system 40 via the communication device 210.

Figure 8:
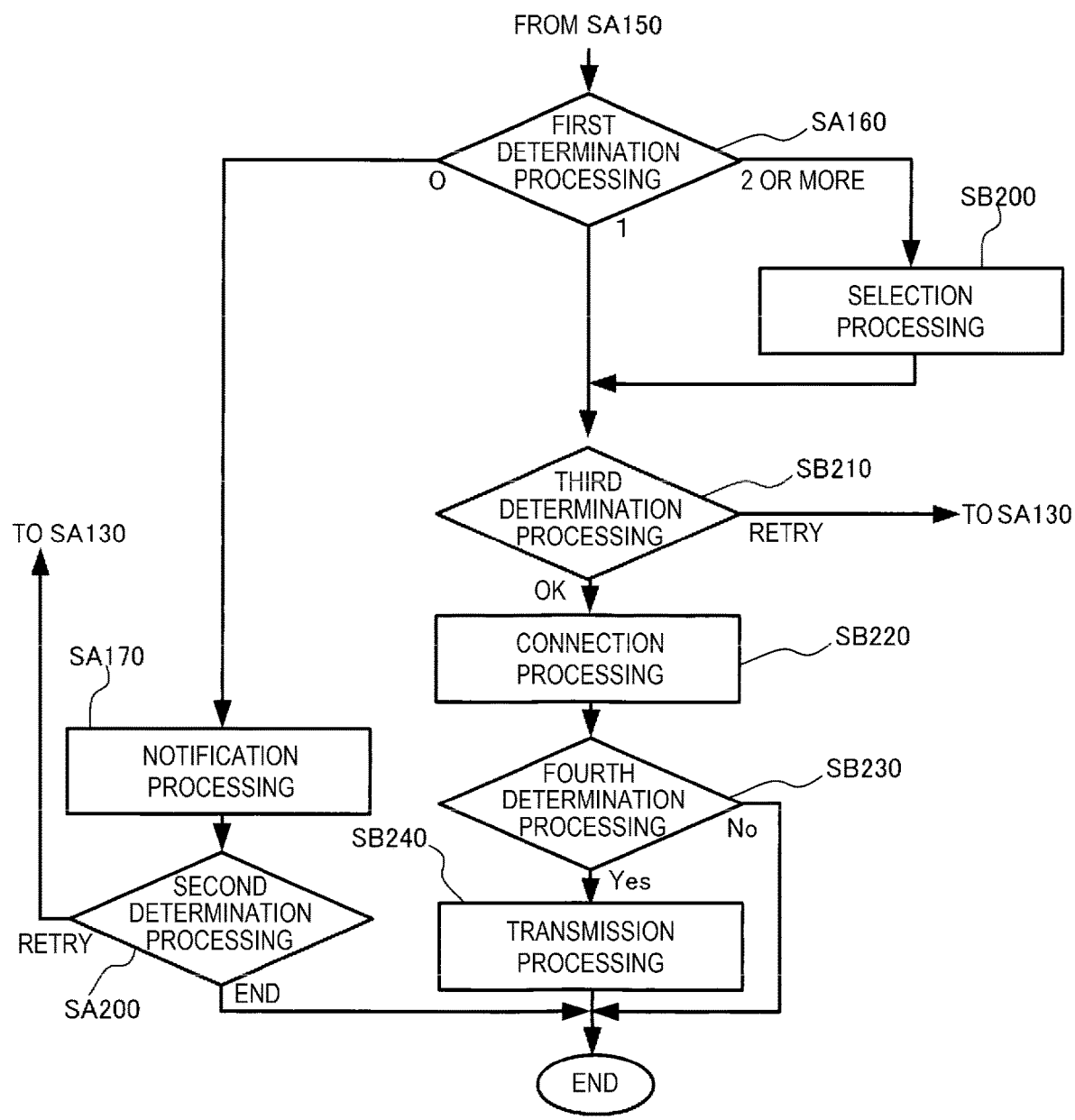
FIG. 8 is a flowchart showing a flow of a setting method according to the second embodiment.

In the setting method executed by the processing device 250 of the information processing device 20B according to the program P2, the flow from the space scanning processing SA110 to the first determination processing SA160 is the same as in the first embodiment. However, in the acceptance processing SA130, the model designation operation, that is, the input of the identification information, is omitted. FIG. 8 is a flowchart showing the flow from the first determination processing SA160 onward in the setting method according to this embodiment. As is clear from the comparison between FIG. 8 and FIG. 6, the setting method according to this embodiment differs from the setting method according to the first embodiment in the flow of processing when the number of pieces of setting information acquired in the second acquisition processing SA150 is 1, or 2 or more.

When the number of pieces of setting information acquired in the second acquisition processing SA150 is 1, the processing device 250 defines the setting information acquired in the second acquisition processing SA150 as transmission target setting information and executes third determination processing SB210. In the third determination processing SB210, the processing device 250 causes the touch panel 230 to display a □RETRY□ button for giving an instruction to re-enter arrangement information and an □OK□ button for giving an instruction not to re-enter arrangement information and determines which button is pressed. When it is determined that an operation of pressing the □RETRY□ button is performed, the processing device 250 executes again the processing from the acceptance processing SA130 onward. Meanwhile, when it is determined that the □OK□ button is pressed, the processing device 250 executes connection processing SB220.

In the connection processing SB220, the processing device 250 establishes communication connection with the ordering system 40, using the communication device 210, and causes the display device of the touch panel 230 to display an ordering screen for ordering the projector 10. In fourth determination processing SB230 following the connection processing SB220, whether the projector 10 is ordered or not is determined. When the result of the determination in the fourth determination processing SB230 is □Yes□, that is, in response to the detection that the projector 10 is ordered, the processing device 250 executes transmission processing SB240 and subsequently ends this setting method. When the result of the determination in the fourth determination processing SB230 is □No□, the processing device 250 ends this setting method without executing the transmission processing SB240. In the transmission processing SB240, the processing device 250 transmits the transmission target setting information to the ordering system 40 via the communication device 210.

When the number of pieces of setting information acquired in the second acquisition processing SA150 is 2 or more, the processing device 250 executes selection processing SB200 of causing the user to select one of the plurality of pieces of setting information acquired in the second acquisition processing SA150. In the selection processing SB200, the processing device 250 causes the display device of the touch panel 230 to sequentially display each of the plurality of pieces of setting information acquired in the second acquisition processing SA150 and the identification information included in the record REC including the setting information, for example, in order from the smallest discrepancy from a rectangle, and prompts the user to select one piece of setting information. When the record REC forming the setting database DB includes additional information representing the price of the projector, the identification information and the setting information may be displayed on the display device in order from the lowest or highest price represented by the additional information. The processing device 250 then defines the setting information selected in the selection processing SB200 as transmission target setting information and executes the processing from the third determination processing SB210 onward.

Figure 9:
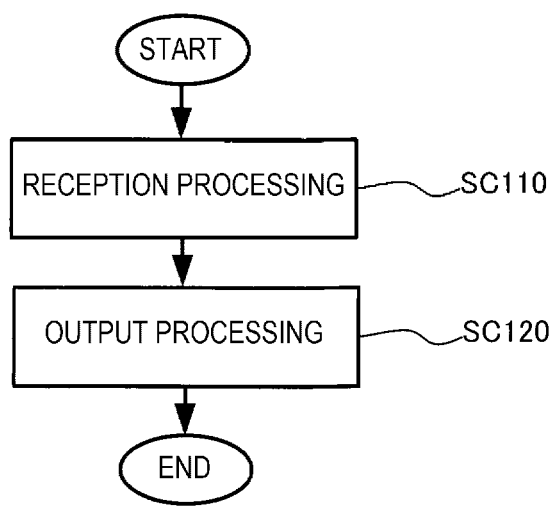
FIG. 9 is a flowchart showing a flow of setting processing executed in the second embodiment.

Meanwhile, the ordering system 40 executes setting processing shown in FIG. 9 in response to the detection that the projector 10 is ordered. As shown in FIG. 9, this setting processing includes reception processing SC110 and output processing SC120. In the reception processing SC110, the setting information transmitted to the ordering system 40 from the information processing device 20B by the transmission processing SB240 is received. In the output processing SC120, the setting information received in the reception processing SC110 is outputted to the projector 10 to be dispatched to the ordering party and the projector 10 stores this setting information. In this embodiment, the projector 10 in which the setting information is already set by the setting processing shown in FIG. 9 is dispatched to the ordering party who has ordered this projector 10. Therefore, the user receiving the projector 10 can easily use the projector 10 without manually configuring settings on the projector 10.

As described above, with the information processing device 20B according to this embodiment, too, the user can perform the operation of designating the position of the icon G3 in the simulation image G4 and the operation of designating the size of the image G5 and thus can cause the projector 10 to store the setting information for projecting the projection image G1 of that size onto the projection surface SC from the projector 10 installed at that position. The information processing device 20B according to this embodiment, too, enables even a user who is unfamiliar with the handling of the projector 10 to easily configure settings on the projector 10. The ordering system 40 in this embodiment is a computer system accepting an order for purchasing the projector 10. However, the ordering system 40 may be a computer system accepting an order for renting the projector 10.

3. Modifications

The embodiments can be modified as follows.

(1) In the second embodiment, the ordering system 40 executes the setting processing shown in FIG. 9 in response to the detection that the projector 10 is ordered, and the projector 10 on which the setting information received in the reception processing SC110 is already set is dispatched to the ordering party. However, the output processing SC120 need not be executed immediately after the reception processing SC110. For example, after the reception processing SC110, the projector 10 not storing the setting information may be dispatched to the ordering party, and the output processing SC120 may be executed in response to an access to the ordering system 40 by the projector 10 via the telecommunications line 30. This configuration has the same effects as in the second embodiment.

(2) After the execution of the reception processing SC110 shown in FIG. 9 and before the execution of the output processing SC120, the processing of writing the setting information received in the reception processing SC110 into a storage device such as a memory stick coupled to the projector 10 to be dispatched to the ordering party may be executed. The storage device coupled to the projector 10 may also be referred to as a second storage device. The output processing SC120 in this configuration is the processing of outputting the setting information from the second storage device to the projector 10 in response to the coupling of the second storage device to the projector 10. The output processing SC120 in this configuration may be executed by the ordering system 40 or by the ordering party. When the ordering system 40 executes the output processing SC120 in this configuration, the projector 10 on which the setting information is already set is dispatched to the ordering party. When the ordering party executes the output processing SC120 in this configuration, the second storage device in which the setting information received in the reception processing SC110 is written and the projector 10 on which the setting information is not set yet are dispatched to the ordering party. When the ordering system 40 executes the output processing SC120 in this configuration, the ordering party ordering the projector 10 may be made to designate a second storage device and the setting information may be written into this second storage device via the telecommunications line 30. In the configuration where the setting information is written into the second storage device designated by the ordering party ordering the projector 10, the second storage device need not be dispatched.

(3) The space scanner 251, the display controller 252, the operation acceptor 253, the first acquirer 254, the second acquirer 255, and the outputter 256 in the first embodiment are software modules. However, these components may be hardware modules such as ASICs (application-specific integrated circuits). Similarly, the space scanner 251, the display controller 252, the operation acceptor 253, the first acquirer 254, the second acquirer 255, and the transmitter 257 in the second embodiment may be hardware modules such ASICs. In the first embodiment, the setting database DB is stored in the storage device 240 of the information processing device 20A. However, the setting database DB may be stored in a storage device accessible by the processing device 250 of the information processing device 20A via the communication device 210. The same applies to the setting database DB in the second embodiment.

(4) In the first and second embodiments, the processing device 250 acquires the arrangement information in response to the first operation of designating the size of the image G5 corresponding to the projection image G1 and the operation of designating the position of the icon G3 corresponding to the projector 10. However, the user may be made to input the first information representing the positional relationship between the projector 10 and the projection surface SC and the second information representing the size of the projection image G1, in the form of numeric values, and the processing device 250 may acquire the arrangement information according to the numeric values inputted by the user. In the configuration where the user inputs the first information and the second information in the form of numeric values, the space scanner 251 and the display controller 252 are not necessary. The space scanning processing SA110 and the display control processing SA120 are not necessary, either.

(5) The information processing device 20A in the first embodiment and the information processing device 20B in the second embodiment are a smartphone. However, the information processing device 20A and the information processing device 20B may be tablet terminal or a personal computer. In the first embodiment, the program P1 is stored in advance in the storage device 240 of the information processing device 20A. However, the program P1 may be manufactured or distributed as a single product. As a specific form of distribution of the program P1, the program P1 may be written in a computer-readable recording medium such as a flash ROM (read-only memory) and distributed in this form, or may be downloaded and distributed via a telecommunications line such as the internet. Causing the computer of a typical smartphone according to the program P1 distributed in these forms enables the smartphone to function as the information processing device according to the present disclosure. Similarly, the program P2 in the second embodiment may be manufactured or distributed as a single product.

4. Aspects Grasped from at Least One of Embodiments and Modification Examples The present disclosure is not limited to the above embodiments and modification examples and can be implemented according to various aspects without departing from the spirit and scope of the present disclosure. For example, the present disclosure can be implemented according to the aspects described below. A technical feature in the embodiments corresponding to a technical feature in the aspects described below can be suitably replaced or combined in order to solve a part or all of the problems of the present disclosure or in order to achieve a part or all of the effects of the present disclosure. The technical feature can be suitably deleted unless described as essential in the specification.

According to an aspect of the present disclosure, a setting method may include the first acquisition processing SA140, the second acquisition processing SA150, and the output processing, described below. In the first acquisition processing SA140, the arrangement information including the first information representing the positional relationship between the projector 10 and the projection surface SC and the second information representing the size of the projection image G1 projected onto the projection surface SC from the projector 10 is acquired. In the second acquisition processing SA150, one or a plurality of pieces of setting information are acquired, based on the arrangement information acquired in the first acquisition processing SA140. Each of the one or plurality of pieces of setting information includes a plurality of setting values used for the projector 10 to project the projection image G1 onto the projection surface SC. The output processing is either the first output processing SA180 and the second output processing SA190 or the processing of outputting the setting information transmitted in the transmission processing SB240, to the projector 10. In the output processing, one piece of setting information of the one or plurality of pieces of setting information acquired in the second acquisition processing SA150 is outputted to the projector 10. The setting method according to this aspect enables easy setting in the projector 10 of the setting information for projecting the projection image G1 of the size represented by the second information onto the projection surface SC from the projector 10 having the positional relationship with the projection surface SC represented by the first information.

According to another aspect, the setting method may also include the image pickup processing, the display control processing SA120, and the acceptance processing SA130, described below. In the image pickup processing, a picked-up image of the space including the projection surface SC picked up by the image pickup device 220 is acquired. In the display control processing SA120, the simulation image G4 in which the image G5 corresponding to the projection image G1 and the icon G3 indicating the projector 10 are superimposed on the picked-up image is displayed on the display device of the touch panel 230. In the acceptance processing SA130, the first operation of designating the size of the image G5 and the second operation of designating the position of the icon G3 are accepted. Then, in the first acquisition processing SA140, the arrangement information is acquired according to the first operation and the second operation accepted in the acceptance processing SA130. According to this aspect, the arrangement information can be acquired by the simple procedures of the first operation and the second operation on the simulation image G4.

According to another aspect, in the setting method, when the one or plurality of pieces of setting information is a plurality of pieces of setting information, an operation of selecting the one piece of setting information to be outputted to the projector 10 from among the plurality of pieces of setting information may be accepted in the acceptance processing SA130. According to this aspect, the user can select the one piece of setting information to be outputted to the projector 10 from among the plurality of pieces of setting information.

According to another aspect, the setting method may also include the transmission processing SB240 of transmitting the one piece of setting information to the ordering system 40 accepting an order for the projector 10. According to this aspect, the ordering system 40 can set the setting information corresponding to the positional relationship between the projector 10 and the projection surface SC and the size of the projection image G1, in the projector 10 ordered from the ordering system 40. The user can easily use the projector 10 without manually configuring settings on the projector 10.

According to another aspect, in the setting method, the transmission processing SB240 may be executed in response to the detection that the projector 10 has been ordered from the ordering system 40. In the output processing according to this aspect, the ordering system 40 outputs the received one piece of setting information to the projector 10 to be dispatched to the ordering party. According to this aspect, the setting information corresponding to the positional relationship between the projector 10 and the projection surface SC and the size of the projection image G1 can be set in the projector 10 ordered from the ordering system 40, and the projection 10 in which the setting information is already set can be dispatched to the ordering party. According to this aspect, again, the user can easily use the projector 10 without manually configuring settings on the projector 10.

According to another aspect, in the setting method, the output processing may be executed in response to an access to the ordering system 40 by the projector 10 dispatched to the ordering party. In the output processing according to this aspect, the ordering system 40 outputs the received one piece of setting information to the projector 10 dispatched to the ordering party. According to this aspect, the setting information corresponding to the positional relationship between the projector 10 and the projection surface SC and the size of the projection image G1 can be set in the projector 10 received by the ordering party. According to this aspect, again, the user can easily use the projector 10 without manually configuring settings on the projector 10.

According to another aspect, the output processing in the setting method may include processing in which the ordering system 40 outputs the received setting information to a storage device coupled to the projector 10 to be dispatched to the ordering party, and processing in which the setting information is outputted to the projector 10 from the storage device in response to the coupling of the storage device to the projector 10 dispatched to the ordering party. According to this aspect, the setting information corresponding to the positional relationship between the projector 10 and the projection surface SC and the size of the projection image G1 can be set in the projector 10 ordered from the ordering system 40. According to this aspect, again, the user can easily use the projector 10 without manually configuring settings on the projector 10.

According to another aspect of the present disclosure, a program causes a computer to execute the first acquisition processing SA140 and the second acquisition processing SA150. The program according to this aspect enables the designation of the positional relationship between the projector 10 and the projection surface SC and the size of the projection image G1 and thus enables easy setting in the projector 10 of the setting information corresponding to the positional relationship between the projector 10 and the projection surface SC and the size of the projection image G1.

What is claimed is:

1. A setting method comprising:
    acquiring arrangement information including first information representing a positional relationship between a projector and a projection surface and second information representing a size of a first image projected onto the projection surface from the projector;
    acquiring, based on the arrangement information, one or a plurality of pieces of setting information, each of which including a plurality of setting values used for the projector to project the first image onto the projection surface;
    outputting one piece of setting information of the one or plurality of pieces of setting information to the projector;
    acquiring a second image provided by picking up an image of a space including the projection surface, using an image pickup device;

displaying a fourth image in which an image corresponding to the first image and a third image indicating the projector are superimposed on the second image, using a display device; and receiving a first operation of designating a size of the first image in the fourth image and a second operation of designating a position of the third image in the fourth image, wherein the arrangement information is acquired according to the first operation and the second operation.

2. The setting method according to claim 1, further comprising:

when the one or plurality of pieces of setting information are a plurality of pieces of setting information, receiving an operation of selecting the one piece of setting information from among the plurality of pieces of setting information.

3. The setting method according to claim 1, further comprising:

transmitting the one piece of setting information to an ordering system receiving an order for purchasing the projector.

4. The setting method according to claim 3, wherein the transmitting to the ordering system includes transmitting the one piece of setting information to the ordering system in response to a detection that the projector is ordered from the ordering system.

5. The setting method according to claim 4, wherein the outputting includes outputting the one piece of setting information from the ordering system to the projector.

6. The setting method according to claim 5, wherein the outputting includes outputting the one piece of setting information from the ordering system to the projector dispatched to an ordering party ordering the projector, in response to an access to the ordering system by the projector.

7. The setting method according to claim 4, further comprising:

outputting the one piece of setting information from the ordering system to a storage device coupled to the projector, wherein the outputting to the projector includes outputting the one piece of setting information from the storage device to the projector in response to a coupling of the storage device to the projector.

8. A non-transitory computer-readable storage medium storing a program, the program causing a computer to execute:

acquiring arrangement information including first information representing a positional relationship between a projector and a projection surface and second information representing a size of a first image projected onto the projection surface from the projector;

acquiring, based on the arrangement information, one or a plurality of pieces of setting information, each of which including a plurality of setting values used for the projector to project the first image onto the projection surface;

acquiring a second image provided by picking up an image of a space including the projection surface, using an image pickup device;

displaying a fourth image in which an image corresponding to the first image and a third image indicating the projector are superimposed on the second image, using a display device; and receiving a first operation of designating a size of the first image in the fourth image and a second operation of designating a position of the third image in the fourth image, wherein the arrangement information is acquired according to the first operation and the second operation.

9. The non-transitory computer-readable storage medium according to claim 8, the program causing the computer to further execute:

when the one or plurality of pieces of setting information are a plurality of pieces of setting information, receiving an operation of selecting the one piece of setting information from among the plurality of pieces of setting information.

10. The non-transitory computer-readable storage medium according to claim 9, the program causing the computer to further execute:

transmitting the one piece of setting information to an ordering system receiving an order for purchasing the projector.

11. The non-transitory computer-readable storage medium according to claim 10, wherein the transmitting to the ordering system includes transmitting the one piece of setting information to the ordering system in response to a detection that the projector is ordered from the ordering system.

12. The non-transitory computer-readable storage medium according to claim 9, the program causing the computer to further execute:

acquiring identification information of the projector;

conducting a search of a setting database that stores recorded setting information using a search key that is formed based on the identification information and the arrangement information; and acquiring, based on the search, the one or the plurality of pieces of setting information.

13. A setting method comprising:

acquiring arrangement information including first information representing a positional relationship between a projector and a projection surface and second information representing a size of a first image projected onto the projection surface from the projector;

acquiring, based on the arrangement information, one or a plurality of pieces of setting information, each of which including a plurality of setting values used for the projector to project the first image onto the projection surface;

outputting one piece of setting information of the one or plurality of pieces of setting information to the projector; and transmitting the one piece of setting information to an ordering system receiving an order for purchasing the projector.

14. The setting method according to claim 13, further comprising:

acquiring a second image provided by picking up an image of a space including the projection surface, using an image pickup device;

displaying a fourth image in which an image corresponding to the first image and a third image indicating the projector are superimposed on the second image, using a display device; and receiving a first operation of designating a size of the first image in the fourth image and a second operation of designating a position of the third image in the fourth image, wherein
the arrangement information is acquired according to the first operation and the second operation.

15. The setting method according to claim 13, further comprising:
when the one or plurality of pieces of setting information are a plurality of pieces of setting information, receiving an operation of selecting the one piece of setting information from among the plurality of pieces of setting information.

16. The setting method according to claim 13, wherein
the transmitting to the ordering system includes transmitting the one piece of setting information to the ordering system in response to a detection that the projector is ordered from the ordering system.

17. The setting method according to claim 16, wherein
the outputting includes outputting the one piece of setting information from the ordering system to the projector.

18. The setting method according to claim 17, wherein
the outputting includes outputting the one piece of setting information from the ordering system to the projector dispatched to an ordering party ordering the projector, in response to an access to the ordering system by the projector.

19. The setting method according to claim 16, further comprising:
outputting the one piece of setting information from the ordering system to a storage device coupled to the projector, wherein
the outputting to the projector includes outputting the one piece of setting information from the storage device to the projector in response to a coupling of the storage device to the projector.

* * * * *